(12) United States Patent
Saatchi et al.

(10) Patent No.: US 8,971,856 B2
(45) Date of Patent: Mar. 3, 2015

(54) PERSONALIZING AN ACCESSORY WITH DIGITAL CONTENT

(71) Applicant: Cellco Partnership, Basking Ridge, NJ (US)

(72) Inventors: Saeed S. Saatchi, Middletown, NJ (US); Charles Lane, Somerset, NJ (US); Ning Zhang, Warren, NJ (US); Evaristo Gonzalez, Jersey City, NJ (US); Ioannis Tsampalis, Bridgewater, NJ (US)

(73) Assignee: Cellco Partnership, Basking Ridge, NJ (US)

( * ) Notice: Subject to any disclaimer, the term of this patent is extended or adjusted under 35 U.S.C. 154(b) by 96 days.

(21) Appl. No.: 13/730,213

(22) Filed: Dec. 28, 2012

(65) Prior Publication Data

US 2014/0187201 A1 Jul. 3, 2014

(51) Int. Cl.
*H04M 1/02* (2006.01)

(52) U.S. Cl.
CPC ..................................... *H04M 1/026* (2013.01)
USPC ............................................ 455/411; 709/217

(58) Field of Classification Search
CPC ....... H04W 12/06; H04W 4/12; G06Q 20/105
USPC ....................... 455/411, 466; 709/217; 705/41
See application file for complete search history.

(56) References Cited

U.S. PATENT DOCUMENTS

| | | | |
|---|---|---|---|
| 6,954,658 B2 | 10/2005 | Engstrom et al. | |
| 2003/0017848 A1 | 1/2003 | Engstrom et al. | |
| 2004/0091232 A1 | 5/2004 | Appling | |
| 2005/0014526 A1 | 1/2005 | Pan | |
| 2005/0026661 A1 | 2/2005 | Rheenen et al. | |
| 2005/0139683 A1 | 6/2005 | Yi | |
| 2005/0197895 A1 | 9/2005 | Faulk | |
| 2006/0148522 A1 | 7/2006 | Chipchase et al. | |
| 2008/0176587 A1* | 7/2008 | Glazer et al. ................. | 455/466 |
| 2010/0065630 A1 | 3/2010 | Spencer, II | |
| 2011/0140841 A1 | 6/2011 | Bona et al. | |
| 2011/0159924 A1 | 6/2011 | Gonzalez et al. | |
| 2011/0270523 A1 | 11/2011 | Cutitta, II | |
| 2012/0035989 A1 | 2/2012 | Abel et al. | |
| 2013/0185202 A1* | 7/2013 | Goldthwaite et al. .......... | 705/41 |

FOREIGN PATENT DOCUMENTS

| | | |
|---|---|---|
| EP | 1 916 589 A1 | 4/2008 |
| JP | 2008-048071 A | 2/2008 |
| WO | WO-2005/027480 A1 | 3/2005 |

OTHER PUBLICATIONS

Extended European Search Report dated Jul. 28, 2011 for European Patent Application No. 10016212.2, filed Dec. 20, 2010 (published Jul. 6, 2011 as EP 2,341,695 A2), entitled "Matching Themes Between Accessories and Associated Electronic Devices" (European counterpart to U.S. Appl. No. 12/650,677).
European Search Report issued in European Patent Application No. 10016212.2-2414, dated Apr. 5, 2011.
Office Action mailed Feb. 21, 2012 issued by the U.S. Patent Office in U.S. Appl. No. 12/650,677.
Office Action mailed May 10, 2012 issued by the U.S. Patent Office in U.S. Appl. No. 12/650,677.
Office Action mailed Aug. 29, 2012 issued by the U.S. Patent Office in U.S. Appl. 12/650,677.

* cited by examiner

*Primary Examiner* — Phuoc H Doan (57) ABSTRACT

A distribution server is configured to receive from a web portal information about an order request for an accessory and digital content. The distribution server stores the digital content at the distribution server along with authentication information used to authenticate a retrieval request for the digital content from a mobile device. The authentication information includes a claim receipt for the digital content and a Mobile Directory Number (MDN) associated with the mobile device. The mobile device sends the retrieval request to the distribution server. Responsive to the retrieval request, the distribution server determines whether the mobile device is authorized to receive the digital content. Upon determining the mobile device is authorized to receive the digital content, the distribution server forwards the digital content over a communication network to the mobile device.

24 Claims, 7 Drawing Sheets

PERSONALIZING AN ACCESSORY WITH DIGITAL CONTENT

BACKGROUND

The existing methods of delivering a mobile device accessory such as, for example, a phone cover versus delivering digital content are different for a number of reasons, including involving entirely different distribution channels. If a phone related gift that includes both phone accessory and mobile digital content is to be sent, the two types of gifts are sent separately, which may cause less than optimal experience at the receiving end.

Hence a need exists for allowing integration of digital content into a physical accessory and empowering the accessory to become a vehicle to deliver the digital content to a mobile device user.

BRIEF DESCRIPTION OF THE DRAWINGS

The drawing figures depict one or more implementations in accord with the present teachings, by way of example only, not by way of limitation. In the figures, like reference numerals refer to the same or similar elements.

DETAILED DESCRIPTION

In the following detailed description, numerous specific details are set forth by way of examples in order to provide a thorough understanding of the relevant teachings. However, the present teachings may be practiced without such details. In other instances, well known methods, procedures, components, and/or circuitry have been described at a relatively high-level, without detail, in order to avoid unnecessarily obscuring aspects of the present teachings.

In one implementation, the instant application describes a system and a server client application platform that may allow a user to buy digital content to add to an accessory that is augmented with an NFC technology or another similar short range technology such as, for example, RFID. For the sake of simplicity and brevity of description, the following description assumes that the NFC technology is being used. The digital content may be delivered with the accessory and subsequently be consumed on a mobile device using the accessory. The user may be able to go to a web portal to purchase a personalized accessory for gifting. At the web portal, the user may also buy digital content and have the digital content wrapped in a virtual gift box to be combined with the accessory. The virtual gift box may include digital information programmed on a memory element to be added to the accessory. The digital information may identify a server storing the digital content and a claim receipt for retrieving the digital content. In one example, the virtual gift box may be programmed into an NFC chip embedded in the accessory to be shipped. When the person receiving the accessory attaches the accessory to his/her NFC capable mobile device, a preloaded application on the person's mobile device may use the NFC reader in the phone to open the virtual gift box contained within the accessory, read the information stored on the virtual gift box, and claim the digital content identified within the virtual gift box from the cloud. The cloud may correspond to the server that stores the digital content and may be accessible to the mobile device via a mobile traffic network. In one example, the cloud corresponds to a distribution server associated with a mobile communication network provider. In another example, the cloud corresponds to a merchant server, which is in communication with the mobile device over a mobile traffic network. This sequence of activities on the mobile device may happen without a user intervention because the system and platform leverages the NFC technology. In this manner, the system and platform offers an intuitive and simple user experience for customers to receive digital content as a gift with a physical accessory.

To this end, an accessory that has NFC technology embedded in it is described. The NFC technology may be used here to allow a static physical accessory to deliver personalized digital content to a NFC capable mobile device. The accessory may be of a type that is in direct physical contact with (or touch) the mobile device during normal use. Alternatively or additionally, the accessory may be of a type that is not in direct contact or touch with the mobile device but instead is located within short range of the mobile device during the normal use. In either case, when the accessory comes within a communication range of the mobile device (e.g., by being simply attached to the mobile device) and without additional user (manual) effort, the mobile device may be able to automatically pick up the virtual gift box containing information about the digital content delivered via the accessory. The entire activity of downloading the digital content into the mobile device may thus happen automatically, i.e. without user intervention.

In another implementation, an application may be capable of discovering a virtual gift box embedded in an augmented mobile device accessory and fetching the digital content (e.g., the gift) from the cloud for the recipient's mobile device to consume is described. The application may be preloaded on the mobile device and may be supported by the mobile device's operating system and application framework. The application may be configured to work only with the NFC augmented accessory or only using NFC technology. In other embodiments, the application may work with other augmented accessories using a different type of short range communication technology such as, for example, Bluetooth and WiFi. As described above, the system and platform may be configured to deliver digital content wrapped in a virtual gift box to the mobile device. The virtual gift box is programmed in a NFC tag which is embedded within or attached to a mobile device accessory. The NFC tag may be a passive unpowered NFC chip. In one example, when the recipient attaches the accessory to his/her NFC capable mobile device, the preloaded application on the recipient mobile device may work with the mobile device's NFC hardware and OS framework to discover and read the virtual gift box from the NFC tag, and subsequently parses and processes the virtual gift box. The application may communicate with the server storing the digital content identified within the virtual gift box to authenticate the mobile device attempting to obtain the digital content with the identification of a mobile device previously indicated by the virtual gift box sender, and, after authentication by the server, fetch and download the digital content to play on the recipient's mobile device.

Figure 1:
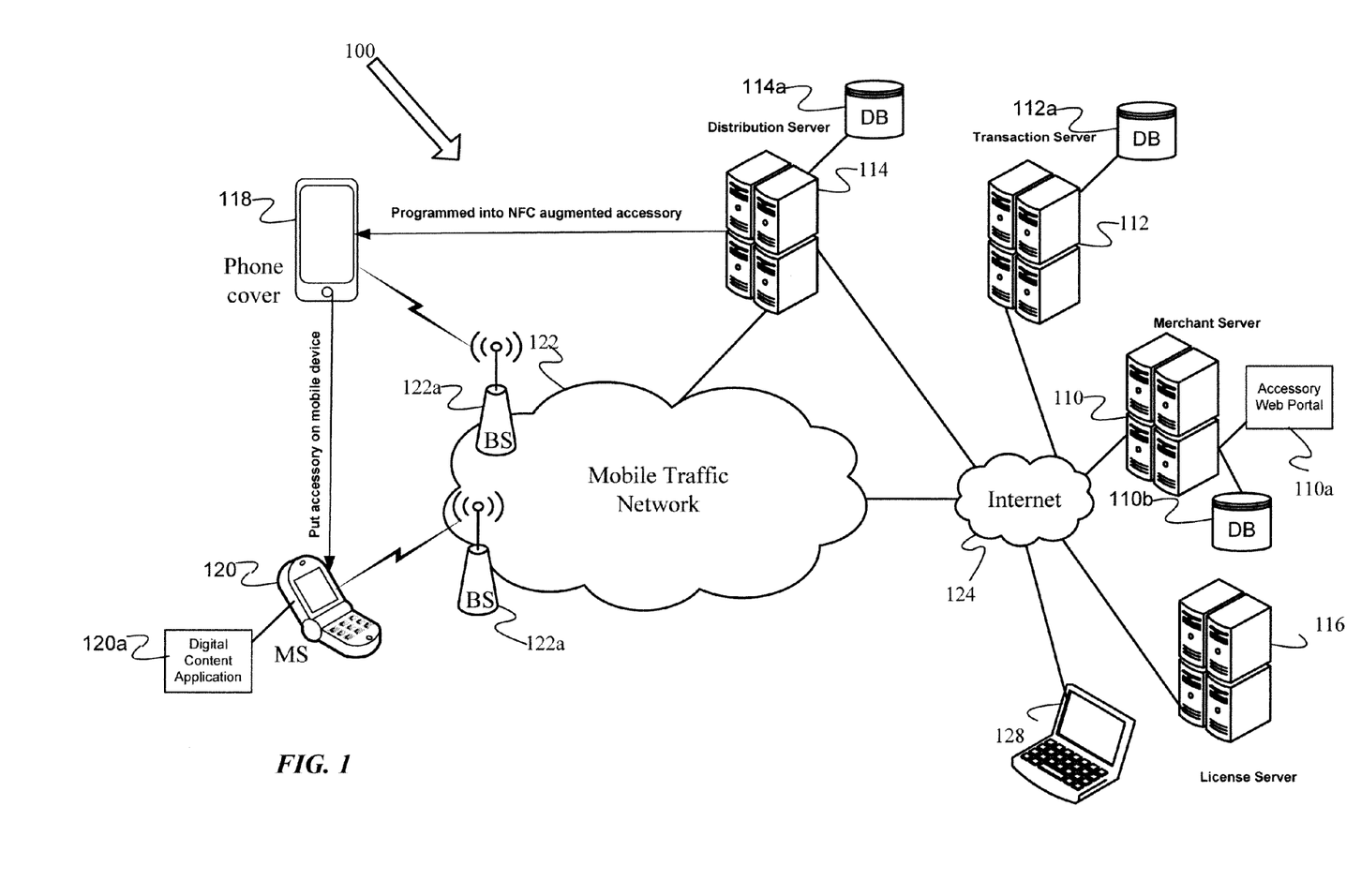
FIG. 1 illustrates an exemplary system for personalizing an accessory with digital content.

Reference now is made in detail to the examples illustrated in the accompanying drawings and discussed below. FIG. 1 illustrates an exemplary system 100 for personalizing an accessory with digital content. The system 100 includes a merchant server 110, a transaction server 112, a distribution server 114, a licensing server 116, an accessory 118, a mobile device 120, a network 122, and an Internet 124, and a computer 128.

The merchant server 110 may provide an accessory web portal 110a. The web portal 110a may be a web site where a user can buy personalized accessory 118. The personalized accessory 118 may include, for example, a phone cover for the mobile device 120. Other examples of the accessory include a case, a protector, a mount, a stand, and/or a speaker. On the web site, the user can select the device model then pick a preset design from a catalog of the web site or upload a photo or image to personalize the phone cover 118. The web portal 110a may be extended to allow user to purchase digital content for addition to the accessory order. The digital content may include an e-card, a wall paper, a ringtone, an MP3, a video, a game or other application, an e-book, etc. To this end, the web portal 110a may provide the user with an accessory catalog and digital content catalog. The web portal 110a may be specific to a particular merchant and may provide digital content for that specific merchant. The web portal 110a may also provide access to other digital content associated with other merchants. The other digital content may be provided as a separate content or bundled together with the merchant's content. Bundled product pricing may be offered to the customer who purchases an accessory and digital content together.

The accessory catalog and the digital content catalog may be stored in the database 110b. The accessory catalog and the digital content catalog may be two separate catalogs or may be combined into a single catalog and stored in the database 110a. Upon ordering the digital content, the merchant server 110 may update the accessory order to include the digital content. To order the digital content and/or the accessory, the user may have to complete a transaction order form, which is provided by the transaction server 112. In one implementation, the transaction server 112 and the merchant server 110 are part of the same server.

The transaction server 112 may be configured to manage orders and transactions which may be placed by the user through the computer 128 or the mobile device 120. The transaction server 112 may include order forms for accessory and digital content purchase. The order forms may be stored in the database 112a. The order foam may ask the user placing the order to specify a Mobile Directory Number (MDN) of the mobile device 120 owned by the person receiving the order. The order form may also ask the user to specify the mailing address of the person receiving the order. The order form may also ask the user to specify the e-mail address of the person receiving the order. The e-mail address may be used to generate an e-mail to the person receiving the order informing him/her that a gift has been purchased and is being mailed to him/her. The order form may also ask the user to specify his/her own e-mail address. The user's e-mail address may be used for sending confirmation message to the user when the gift is shipped to the recipient and when the gift is actually received by the recipient. In one specific example, the server 112 may ask the user placing the order to create an account which can later be used by the user to view the user's existing orders and place additional orders. The account may be created based on login credential provided by the user. The login credential may include a username and a password. The username may include an e-mail address or name associated with the user.

The MDN of the recipient specified in the order form may be used for delivery of the digital content portion of the order; whereas, the mailing address may be used for delivery of the physical accessory portion of the order. After the user selects the digital content and the accessory, enters the recipient's MDN and mailing address, and submits the order, the transaction server 112 forwards the digital content to the distribution server 114. The distribution server 114 may create a virtual gift box that may contain information about the digital content and the manner in which the digital content may be claimed. The digital content may be stored in a database 114a along with information necessary to authenticate a retrieval request from a mobile device 120. The information necessary to authenticate the retrieval request may include a claim receipt and an MDN of the mobile device 120. The virtual gift box created by the distribution server 114 may further contain information about specific time and/or location the recipient can open the virtual gift box to consume the gift as described in more details below. The sender may specify this type of information at the time of placing the order. The virtual gift box may also include the recipient's MDN as a destination address, the address of the server 114 from which the digital content should be claimed as a source address, and a claim receipt for identifying the location of the digital content in the server 114 and retrieving the digital content from the server. The claim receipt may be a unique tracking number registered in the server 114. The digital content may be placed in the data storage 114a on the distribution server 114 for the user to claim, and the claim receipt indicates where the digital content is stored on the distribution server 114.

In one implementation, to prevent devices other than the recipient's device 120 from making false claim for the digital content, which would waste the server's resource to process, the virtual gift box may be encoded with an encoder and the encoded data may only be decoded later by the dedicated mobile application 120a. The decoded virtual gift box may be formatted into an NFC Data Exchange Format (NDEF) message per NDEF specification which defines message format for exchanging information between NFC devices. The NDEF message containing the virtual gift box may be delivered to an accessory manufacturer. The accessory manufacture may write the NDEF message containing the virtual gift box into an NFC tag and embed the NFC tag in the accessory 118. A complete order may be an accessory with a virtual gift box integrated therein. The accessory manufacture may ship the complete order to the recipient's mailing address.

When the recipient receives the order at the recipient's mailing address and puts the phone cover 118 on his/her device 120, the mobile device's 120 NFC reader may discover the NFC tag and may retrieve the data from the tag and dispatch the data to the application 120a on the mobile device 120 for processing. The application 120a may be preloaded on the mobile device 120. If the application 120a is not installed on the device 120, the application 120a may be obtained through the Internet or various other telecommunication networks. Such communications, for example, may enable loading of the application software 120a from one computer or processor into another, for example, from a merchant server 114 or a host computer of the mobile communication network provider into the mobile device 120. The address of the server hosting the application 120a available for download may be stored in the virtual gift box, and the mobile device 120 may contact that server for downloading the application 120a.

If the data is encoded, the application 120a may decode the data to retrieve the virtual gift box. The application 120a may first verify the virtual gift box is addressed to the right mobile device 120 and may then send the claim receipt to the server 114 to claim the digital content. The application 120a may compare the MDN specified in the virtual gift box against the MDN associated with the mobile device 120. If they match, the application 120a may send the claim receipt to the server 114 to claim the digital content. If they do not match, the application 120a may ignore the virtual gift box. The mobile device 120 may be configured to remember the NFC tag and may avoid rereading the NFC tag later. The NFC tag may have a hardware ID unique to that tag. The hardware ID may be read by the mobile device 120 at the time of processing the NFC tag. The mobile device 120 may store the hardware ID to reflect the NFC tag associated with this ID has been processed and should not be proceed again at a later time.

To retrieve the digital content, the application 120a on the mobile device 120 may send a message to the distribution server 114. The message may include the recipient's MDN as a source address, the address of the distribution server 114 as a destination address, and the claim receipt for claiming the digital content. The distribution server 114 may first authenticate the mobile device's 120 request for retrieving the digital content. In one embodiment, the application 120a presents its digital signature to the distribution server 114 to establish trust with the distribution server 114. The application 120a may then open a secure communication link with the distribution server 114 to verify the mobile device's 120 MDN and exchange the digital content. The distribution server 114 may compare the MDN provided by the mobile device 120 against the MDN stored in the database 114a to confirm the digital content belongs to the mobile device 120. If they match, the distribution server 114 may send the digital content to the mobile device 120. If they do not match, the distribution server 114 may inform the mobile device 120 of the same and may not deliver the digital content to the mobile device 120. This MDN check may be in addition or instead of the MDN check performed at the mobile device 120 by the application 120a as discussed above. In another embodiment, an application directed SMS with One Time Password (OTP) may be used for authentication. The application directed SMS may be sent to an application only if the application directed SMS is sent from a carrier-authorized gateway. This may be done for security reasons, and may ensure that the sender of the SMS is a trusted source. The OTP is a password that may be valid for only one login session or transaction. Therefore, a potential intruder who manages to record an OTP already used to log into a service or to conduct a transaction will not be able to abuse the OTP, since the OTP will be no longer valid.

In another embodiment, the distribution server 114 uses the MDN associated with the mobile device 120 for authenticating the mobile device 120. In this scenario, the distribution server 114 compares the MDN against the MDN associated with the digital content stored in the database 114a. Alternatively or additionally, the distribution server 114 may use the claim receipt to authenticate the mobile device.

In any case, once the mobile device 120 is authenticated by the distribution server 114, the distribution server 114 may locate the digital content and inform the mobile device 120 that the digital content is ready for pick up. The application 120a may advise the user that the digital content is waiting for the user at the distribution server 114 and ask if the user wants to accept it, displaying this request on a screen of the mobile device 120. Once the user confirms that the user wants to accept the digital content, the digital content may be downloaded and/or installed on the device 120 and a matching media player or application starts to play the digital content. The distribution server 114 may use the claim receipt to locate the digital content in the database 114a. The application 120a may handle the handshake with the server 114 for authentication and ensure subsequent secure access to the online service to claim the digital content. From the recipient's point of view, all of the above process after the user confirms that the user wants to accept the digital content may be done automatically without user intervention. In another implementation, the delivery of the digital content may be effected without the application 120a asking the user if the user wants to accept the digital content. In this scenario, the new digital content is delivered to the mobile device 120 and upon delivery the user may be notified of the source of the digital content and may be asked to respond to the distribution server 114 and confirm receipt of the digital content. The user may confirm receipt of the digital content by, for example, sending an SMS message and/or an e-mail to the server 114.

If the digital content is Digital Right Management (DRM) protected, the content may be packaged into a protected format first before being put on the distribution server 114. The content protection information and rights for using the content may be transferred to the license server 116, for example. The digital content forwarded to the mobile device 120 may be encrypted using a specific DRM algorithm. If that is the case, the mobile device 120 may need to acquire the license from the license server 116 first before it can decrypt the media to play it. To this end, the mobile device 120 may send a message to the license server 116 to acquire the license. The mobile device 120 may send the message to the license server 116 after acquiring the digital content from the distribution server 114 and realizing that the digital content is DRM protected. The message may include the necessary content protection information and rights which may be compared with the content protection information and rights stored in the license server 116 to determine whether or not allow access to the digital content stored in the database 114a. If so, the license is provided to the mobile device 120 for playing the digital content. The content protection information and rights may include a license number, a frequency in which the digital content can be played on the mobile device 120, a manner of forwarding the digital content to the mobile device 120 (e.g., downloading vs. streaming) and whether the digital content can be forwarded from the mobile device 120 to another device.

The network 122 provides mobile wireless communications services to the mobile device 120 as well as to other mobile devices (not shown), for example, via a number of base stations (BSs) 122a. The present techniques may be implemented in any of a variety of available mobile networks 122 and/or on any type of mobile device compatible with such a network 122, and the drawing shows only a very simplified example of a few relevant elements of the network 122 for purposes of discussion here. The wireless mobile communication network 122 might be implemented as a network conforming to the code division multiple access (CDMA) IS-95 standard, the 3rd Generation Partnership Project 2 (3GPP2) wireless IP network standard or the Evolution Data Optimized (EVDO) standard, the Global System for Mobile (GSM) communication standard, a time division multiple access (TDMA) standard or other standards used for public mobile wireless communications. The mobile device 120 may be capable of voice telephone communications through the network 122, and receiving digital content through NFC augmented accessory. The exemplary device 120 may be capable of data communications through the particular type of network 122 (and the users thereof typically will have subscribed to data service through the network).

The network 122 typically offers a variety of data services via the Internet 124, such as downloads, web browsing, email, etc. By way of example, the drawing shows a laptop PC type user terminal 128 as well as servers 110, 112, 114, and 116 connected to the Internet 124; and the data services for the mobile device 120 via the Internet 124 may be with devices like those shown at 110, 112, 114, and 116 as well as with a variety of other types of devices or systems capable of data communications through various interconnected networks. The mobile device 120 can receive and execute application 120*a* written in various programming languages to implement the functionality of receiving a virtual gift box embedded in an accessory 118 and retrieving the digital content associated with the digital gift box from the cloud.

The mobile device 120 can take the form of a portable handset, a smart-phone or a personal digital assistant, although it may be implemented in other form factors. Program applications, including the system application 120*a* and/or any an application purchased via the Internet 124 can be configured to execute on many different types of mobile device 120. For example, a mobile device application can be written to execute on a binary runtime environment for mobile (BREW-based) mobile device, a Windows Mobile based mobile device, Android, I-Phone, Java Mobile, or RIM based mobile device such as a BlackBerry or the like. Some of these types of devices can employ a multi-tasking operating system.

The system 100 can be implemented by a number of interconnected networks. Hence, the overall network 100 may include a number of radio access networks (RANs), as well as regional ground networks interconnecting a number of RANs and a wide area network (WAN) interconnecting the regional ground networks to core network elements. A regional portion of the network 100, such as that serving the mobile device 120, can include one or more RANs and a regional circuit and/or packet switched network and associated signaling network facilities.

Physical elements of a RAN operated by the mobile service providers or carriers, include a number of base stations represented in the example by the base stations (BSs) 122*a*. Although not separately shown, such a base station 122*a* can include a base transceiver system (BTS), which can communicate via an antennae system at the site of base station and over the airlink with one or more of the mobile device 120, when the mobile devices are within range. Each base station can include a BTS coupled to several antennae mounted on a radio tower within a coverage area often referred to as a "cell." The BTS is the part of the radio network that sends and receives RF signals to/from the mobile devices 13 that are served by the base station 122*a*.

The radio access networks can also include a traffic network represented generally by the cloud at 122, which carries the user communications and data for the mobile device 120 between the base stations 122*a* and other elements with or through which the mobile devices communicate. The network can also include other elements that support functionality other than device-to-device media transfer services such as messaging service messages and voice communications. Specific elements of the network 122 for carrying the voice and data traffic and for controlling various aspects of the calls or sessions through the network 122 are omitted here form simplicity. It will be understood that the various network elements can communicate with each other and other aspects of the system 100 and other networks (e.g., the Internet) either directly or indirectly.

Figure 2A:
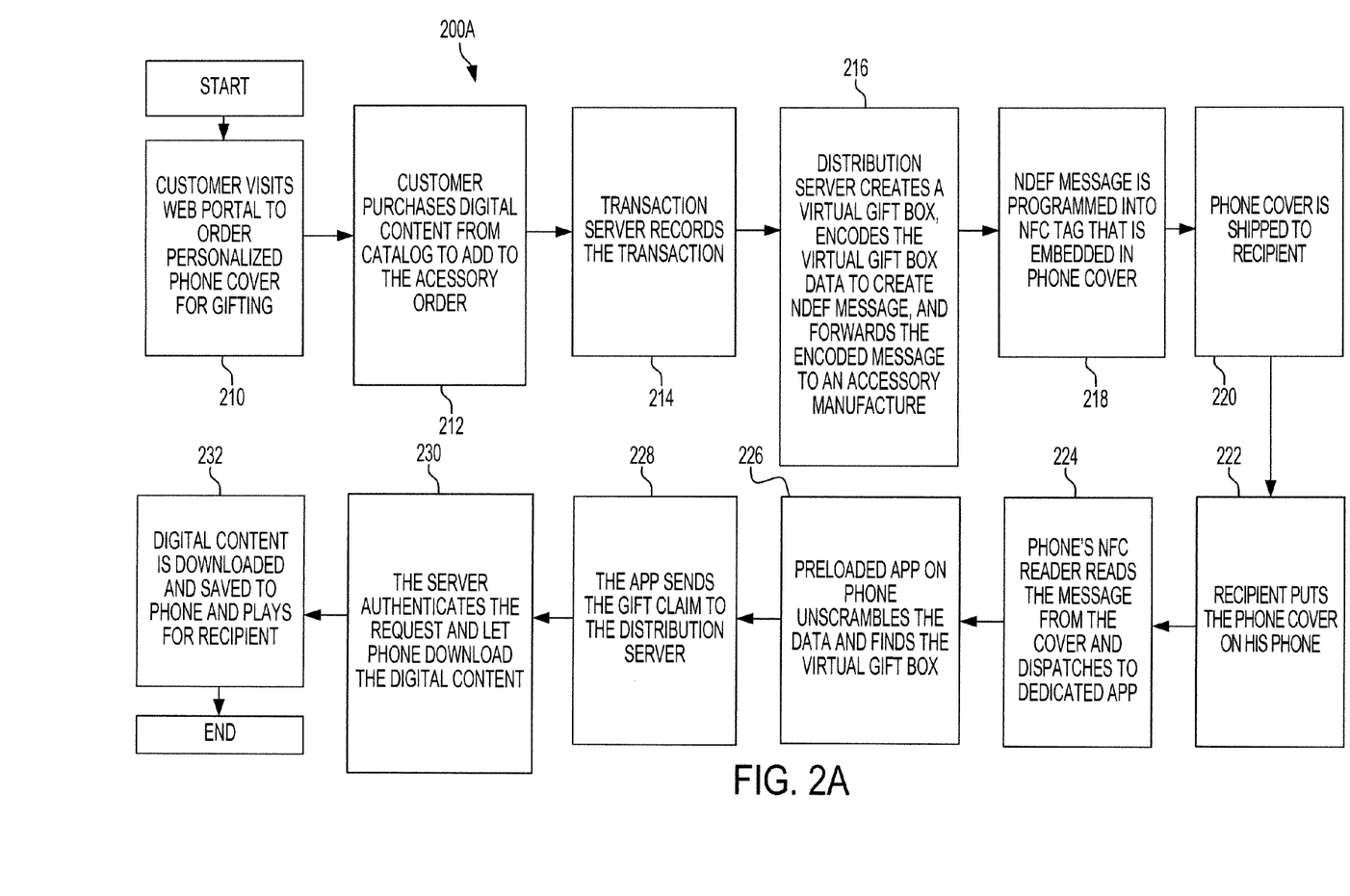
FIG. 2A illustrates an exemplary process for downloading digital content into the mobile device shown in FIG. 1.

FIG. 2A illustrates an exemplary process 200A for downloading digital content into the mobile device 120 shown in FIG. 1. The process 200A begins with the customer visiting the web portal offered by the merchant server 110 to order an accessory for gifting (Step 210). In keeping with the previous example, the accessory includes a personalized phone cover 118. The customer may utilize the computer 128 to access the web site 110*a* to select the personalized phone cover 118. After selecting the personalized phone cover 118, the customer selects digital content from the catalog to add to the accessory order (Step 212). Similar to the accessory, the digital content may also be obtained from the merchant server 110. The merchant server 110 may provide the customer with the catalogs for various accessories and digital content. The catalogs may be stored in the database 110*b*.

The transaction server 112 records the transaction (Step 214). The transaction server 112 may include order forms for accessory and digital content purchase. The order forms may be stored in the database 112*a*. The order form may ask the user placing the order to specify a Mobile Directory Number (MDN) of the mobile device 120 owned by the person receiving the order. The order form may also ask the user to specify the mailing address of the person receiving the order. The MDN may be used for delivery of the digital content portion of the order; whereas, the mailing address may be used for delivery of the personalized phone cover portion of the order. After the user selects the digital content and the accessory, enters the recipient's MDN and mailing address, and submits the order, the transaction server 112 forwards the digital content along with the recipient's MDN and mailing address to the distribution server 114.

The distribution server 114 creates a virtual gift box, encodes the virtual gift box data to create NDEF message, and forwards the encoded message to an accessory manufacture (Step 216). The information about the digital content including its access right and location in the cloud for download may be encoded into the NDEF message using NDEF defined by NFC Forum. The accessory manufacture programs the NDEF message into the NFC tag and embeds the NFC tag in the personalized phone cover 118 by a programming tool (Step 218). The accessory, with the NFC tag coupled thereto, may be shipped to a customer who has a NFC capable mobile device 120 (Step 220). The NFC tag may be a thin adhesive sticker intended to be stuck on the surface of the accessory or embedded inside of the accessory. The personalized phone cover 118 may be shipped to the mailing address of the user of the mobile device 120. The mailing address information may be gleaned from a billing system of the mobile communication network provider 122. Alternatively, the mailing address may be provided by the user at the time user places the order. In this latter scenario, the transaction server 112 may compare the user provided address with the address stored in the billing system and if they do not match, may inform the user of the same and ask the user to confirm the address before finalizing the order.

Upon receiving the personalized phone cover 118, the recipient places the personalized phone cover 118 on the mobile device 120 (Step 222). The phone cover 118 includes the virtual gift box embedded within the NFC tag in the phone cover 118. The information contained in the virtual gift box may include the recipient's device's MDN as a source address, the location in the cloud where to claim the gift as a destination address (e.g., the IP address), and the claim receipt for claiming the digital content stored on the cloud.

The destination address may be the distribution server's 114 IP address and the claim receipt may be the order tracking number. The virtual gift box, may be encoded into a standard NDEF message because most of NFC enabled mobile device platforms know how to process NDEF messages. Since the accessory 118 may not be protected and may be generally accessible by others, the virtual gift box data may be encrypted to prevent eavesdropping so that unnecessary information is not leaked to a person who is not intended to receive it. This is generally because the NDEF message is defined as a standard format; therefore, other unwanted software may attempt to parse the NDEF message to claim the gift that belongs to someone else.

The assembled NDEF message may contain two records— one is the name of the specific application that should be used to handle this type of message; the other is the record that holds the encrypted data of the virtual gift box. The virtual gift box can be encoded as record chunk that carries a chuck of payloads to hold the complete data, or a newly defined MIME (Multipurpose Internet Mail Extensions) type with its payload for storing the binary (encrypted) data.

The NFC-enabled mobile device 120, operating in reader mode, generates radio field and uses the radio signals to communicate with the NFC tag and read the NDEF message stored on the NFC tag (Step 224). The NFC reader on the mobile device 120 may read and extract the NDEF message and any other information contained within the memory of the NFC tag. The information may instruct the NFC reader to forward the NDEF message to the application 120*a*. Upon receiving the NDEF message, the application 120*a* decodes the message to discover the virtual gift box (Step 226). The virtual gift box identifies the server storing the digital content and the claim receipt for claiming the digital content. The application 120*a* connects to the server (e.g., the distribution server 114) and sends the claim receipt to the distribution server 114 (Step 228). The distribution server 114 authenticates the request and lets the mobile device 120 download the digital content (Step 230). Authentication may be performed in several different manners. One way is to let the system application 120*a* present its digital signature to the server 114 to establish trust with the server 114. The application 120*a* may then open a secure communication link with the server 114 to verify the mobile device's 120 MDN and exchange rest of the data. In another embodiment, the distribution server 114 uses the MDN associated with the mobile device 120 for authenticating the mobile device 120. In this connection, the distribution server 114 compares the MDN against the MDN associated with the digital content stored in the database 114*a*.

Upon successful authentication, the digital content is downloaded and saved to the mobile device 120 for playing (Step 232). The digital content may then be matched up to the appropriate application on device for consuming the content. The complete activity of reading the message off the NFC tag and processing it is handled by the on-device application 120*a*, behind the scenes with the device's 120 built-in NFC capability. The entire event may happen automatically In one implementation, the NDEF message on the NFC tag may include instructions about the time the digital content should be claimed from the server 114. For example, the NDEF message may direct the application 120*a* to reveal the digital content to the recipient at a specific time such as, for example, on the recipient's birthday. To this end, when placing the order, the user may indicate the specific time the accessory and the digital portion of the order should be delivered to the person receiving the gift. The accessory, for example, may be set up to be delivered immediately; whereas, the digital content may be delivered at a specific time such as, for example, on the recipient's birthday. To this end, the server 114 may be informed of the recipient's birthday and may deliver the digital content to the telephone number of the recipient on the recipient's birthday.

In another implementation, the NDEF message on the NFC tag may include instructions about the location of the recipient where the digital content should be displayed. The location of the recipient may be tied to the location of the recipient's mobile device. The recipient's mobile device may have to be in a particular location specified by the user when the gift is ordered. The specified location may include the recipient's home, work, or the home of the user placing the order. In one specific example, the application 120*a* monitors the location of the mobile device 120 and requests the digital content when the mobile device 120 is at the specified location. The sender may specify the address at the time of placing the order and the server 114 may convert the address into a geocode and place the geocode in the virtual gift box so that the application 120*a* on device can match it to the device's geographical location. The device's geographic location may be identified based on a GPS or other location-determining circuitry running on the mobile device 120. Upon determining the mobile device 120 is in the specified geographic location, the application 120*a* may submit the claim receipt to the server 114 to retrieve the digital content.

In another example, the server 114 monitors the location of the mobile device 120 and delivers the digital content to the mobile device 120 when the mobile device 120 is at the specified location. Determination about the mobile device's location may be performed based on GPS or location-determining circuitry or software running on the mobile device 120. Alternatively or additionally, the location determination may be performed based on a combination of GPS and a positioning server. The positioning server may include a home location register (HRL) for identifying a mobile switching center (MSC) currently serving the mobile device, and include the serving MSC for acquiring an identification of a cell (cell ID) the mobile device 120 is located in. In such an example, the positioning server may be configured to translate the cell ID received from the serving MSC into geographic location coordinates (such as longitude and latitude), in order to determine the location of the mobile device 120. To this end, the server 114 may be in communication with the mobile device 120 and/or the positioning server to determine the location of the mobile device and deliver the message when the mobile device 120 is at the specific location.

For example, the NDEF message may direct the application 120*a* to reveal the digital content to the recipient when the recipient is at home or another specific location. To this end, the application 120*a* may wait until the specific time is reached or the mobile device 120 is at the specific location and may then connect to the server 114 to claim the digital content. The server 114 also may take a note of this instruction and may restrict access to the digital content until the specific time/date is reached.

Figure 2B:
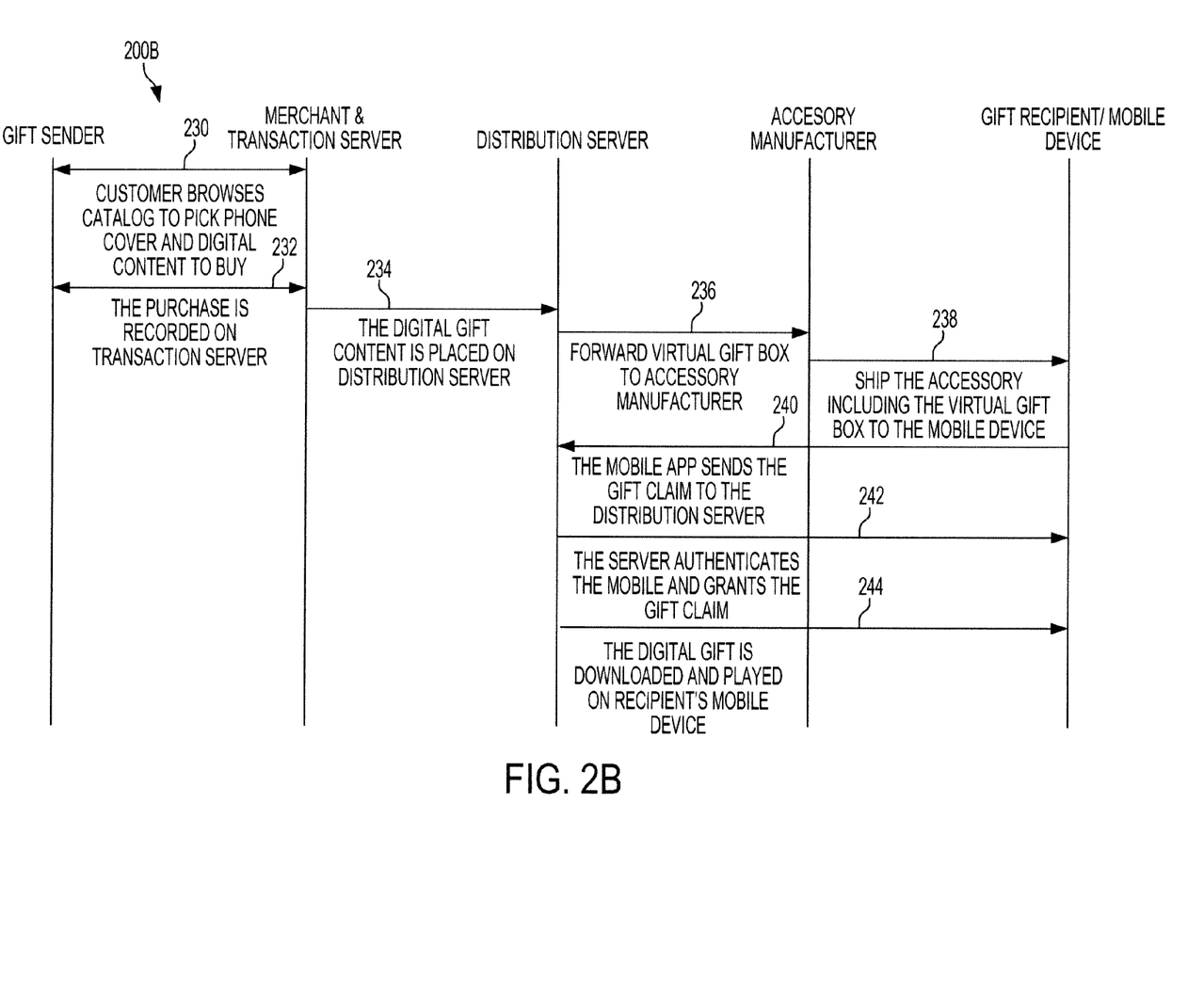
FIG. 2B illustrates an exemplary signal flow for downloading digital content into the mobile device shown in FIG. 1.

FIG. 2B illustrates an exemplary signal flow 200B for downloading digital content into the mobile device 120 shown in FIG. 1. The flow 200B begins with the customer browsing catalog to pick an accessory (e.g., a phone cover) and digital content (Step 230) on the transaction server 112. The transaction server 112 records the purchase (Step 232). The transaction server 112 places the digital gift content along with information about its destination on the distribution server 114 (Step 234). The distribution server 114 stores the digital content and creates a virtual gift box. The virtual gift box includes the claim receipt which can be used to later retrieve the digital content from the distribution server 114. The distribution server 114 forwards the virtual gift box to the accessory manufacturer (Step 236). The accessory manufacture programs the virtual gift box as the NDEF message into an NFC tag that is embedded or attached to the accessory. The manufacturer server then ships the accessory including the NFC tag to the gift recipient (Step 238). The gift recipient places the accessory on the mobile device and an application on the mobile device reads the NFC tag, interprets the NDEF message and finds the virtual gift box (Step 240). The mobile device application 120*a* sends the gift receipt to the distribution server 114 to retrieve the digital content (Step 242). The distribution server 114 authenticates the mobile device 120 and forwards the digital content to the mobile device 120 (Step 244).

Figure 3:
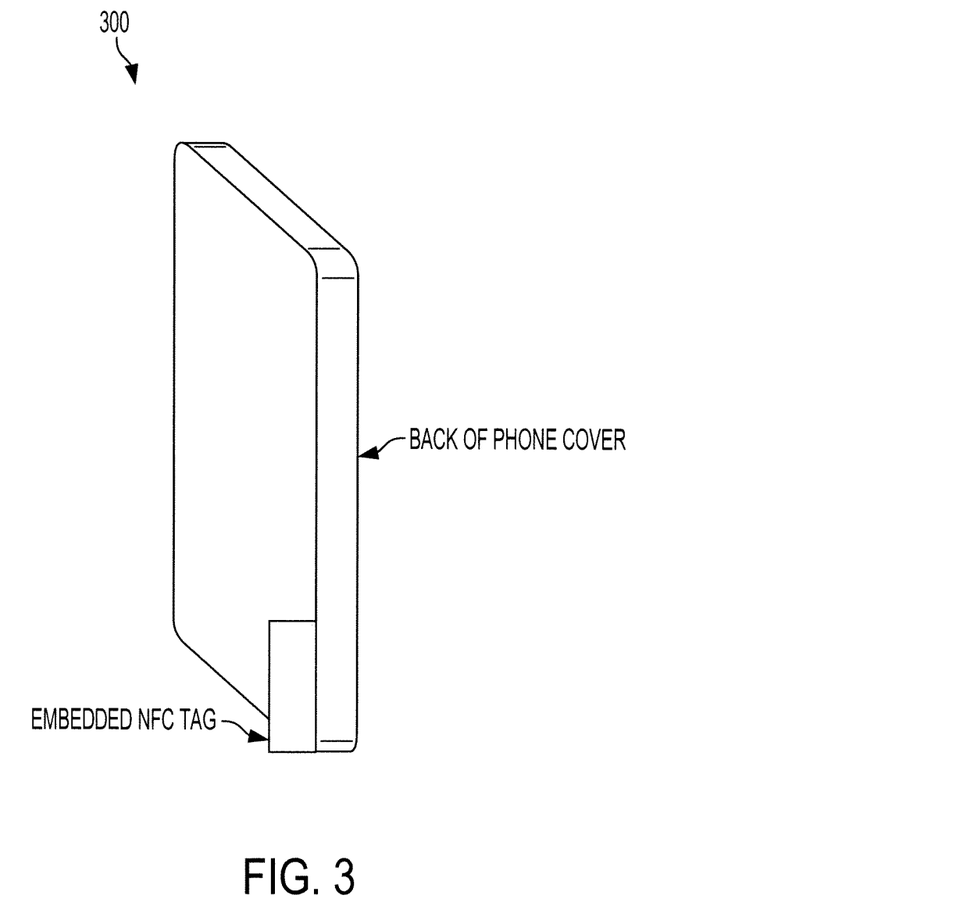
FIG. 3 illustrates an exemplary accessory that includes an embedded NFC tag.

FIG. 3 illustrates an exemplary accessory 300 that includes an embedded NFC tag. The exemplary accessory 300 may correspond to the cover 118 shown in FIG. 1. In one implementation, the accessory 300 may be of the type that has a surface area that is in constant touch/contact with a mobile device 120 during normal use. In such an area, a passive unpowered NFC chip (e.g., a "tag") may be embedded during the manufacturing process. The NFC tags may be similar to stickers in shape and size. The NFC tags may be capable of holding certain amount of data in their memory that can be programmed and read by NFC-capable mobile devices.

The accessory 300 may include an embedded NFC inlay. The inlay type of NFC tags may be thin adhesive stickers intended to be stuck to or be placed inside of objects. Various materials can be used for making NFC augmented accessories and cases such as leather, plastic, rubber, silicon, fiber, cloth, metal, etc., as long as the NFC inlay can be embedded into the material or stuck to the inside of the accessory 300 and the inlay is small enough to fit in.

Figure 4:
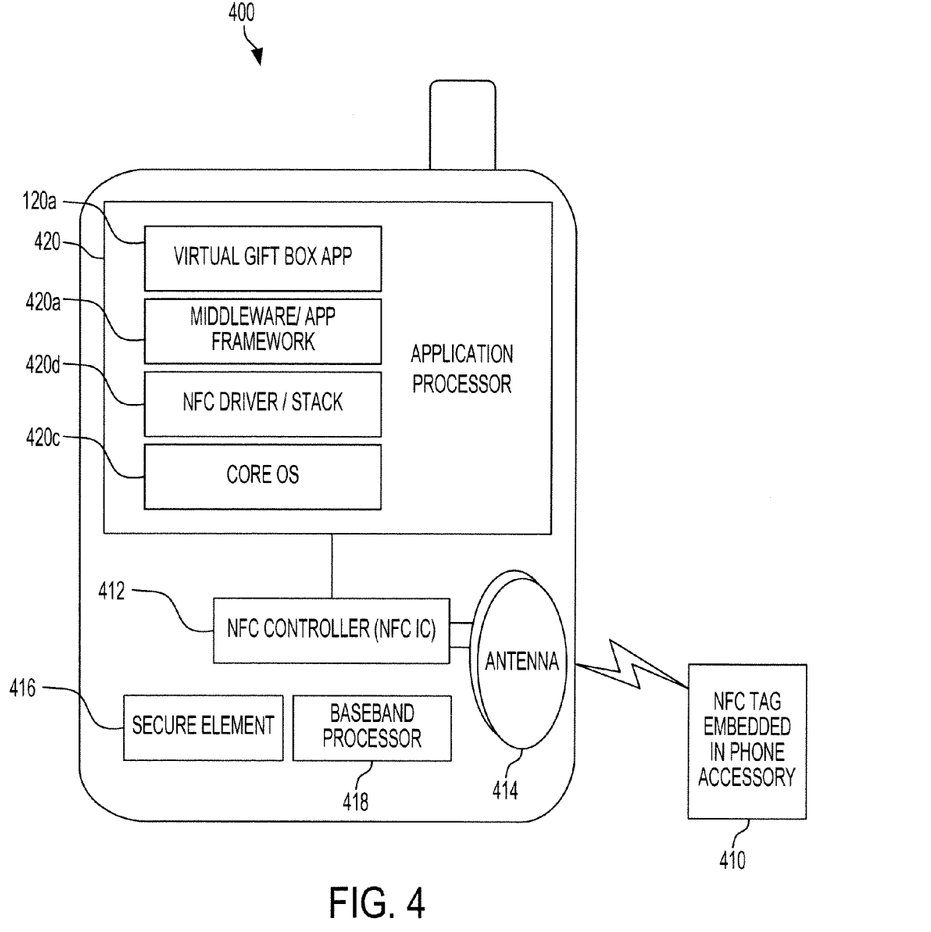
FIG. 4 illustrates an exemplary mobile device including an application for retrieving a message from the embedded NFC tag shown in FIG. 3.

FIG. 4 illustrates an exemplary mobile device including the application 120*a* for retrieving a message from the embedded NFC tag shown in FIG. 3. The application 120*a* that is created for handling the virtual gift box may be preloaded on the mobile device 120. The application 120*a* may be registered with the mobile device's 120 special NFC tag dispatch system which is typically included as part of the mobile device operating system. If NFC is enabled in the mobile device's 120 settings menu, the mobile device 120 may search for NFC tag 410 in the close proximity. In one example, the mobile device 120 searches for NFC tag 410 when its screen is unlocked. When the gift recipient attaches the accessory 118 to the mobile device 120, the mobile device 120 may discover the NFC tag 410 embedded in or attached to the accessory 118. The mobile device's NFC reader 412 scans the NDEF message from the tag 410 using the antenna 414. The mobile device's NFC reader 412 analyzes and parses the message to identify the application 120*a* that is specified in the message. The NFC reader 412 locates the application 120*a* preloaded on device 120 and sends the rest of data to the application 120*a* for further processing.

The application 120*a* may first decrypt the virtual gift box record if it has been encrypted and then fully parse it. In the fully parsed message, the application 120*a* may find the MDN that the gift is intended for. The application 120*a* may then verify if the MDN matches the current mobile device's 120 MDN, and if it matches, the application 120*a* may communicate with the distribution server 114 to request the digital content. If the MDN does not match the mobile device's 120 MDN, the application 120*a* may ignore the message and may not communicate with the distribution server 114 to request the digital content. As noted above, the MDN check may be performed at the distribution server 114 instead or in addition to the check performed at the mobile device 120. In order to claim the digital content, the application 120*a* may need to exchange information with the server 114 to authenticate the mobile device 120 first. As noted above, the application 120*a* can build the trust with the server 114 by showing its digital signature. Then, the application 120*a* may establish a secure communicate link via HTTPS to the server 114. Once the mobile device 120 is authenticated, the server 114 may grant the mobile device access to the digital content stored in the database 114*a*. The application 120*a* may prompt the user with a message via a display (and/or audibly) on the mobile device 120 to tell the user a digital content gift is waiting and seek the user's permission to download the digital content. After the user acknowledges, the digital content may be downloaded to the mobile device 120 and then played to the user. Alternately, the application 120*a* may automatically take all of the steps and download the content, afterward informing the user that the digital content has been downloaded.

The application 120*a* may run on the application processor 420. The processor 420 also runs a middleware/application framework 420*a*, an NFC driver 420*b*, and a core operating system 420*c*. The middleware/application framework 420*a* may be configured to schedule memory management and/or power management and may include instructions for the application 120*a* on how to register with the server 114 and how to perform upgrades. The NFC driver 420*b* may be configured to drive the NFC controller 412. The core operating system 420*c* may include an operating system for Android devices, RIM devices, or Microsoft devices. The secure element 416 may be part of the NFC controller 412 and may be primary used for mobile payment. To this end, the secure element 416 may be configured to store credit card information of the customer. The baseband processor 418 may be configured to process communications over the air.

Figure 5:
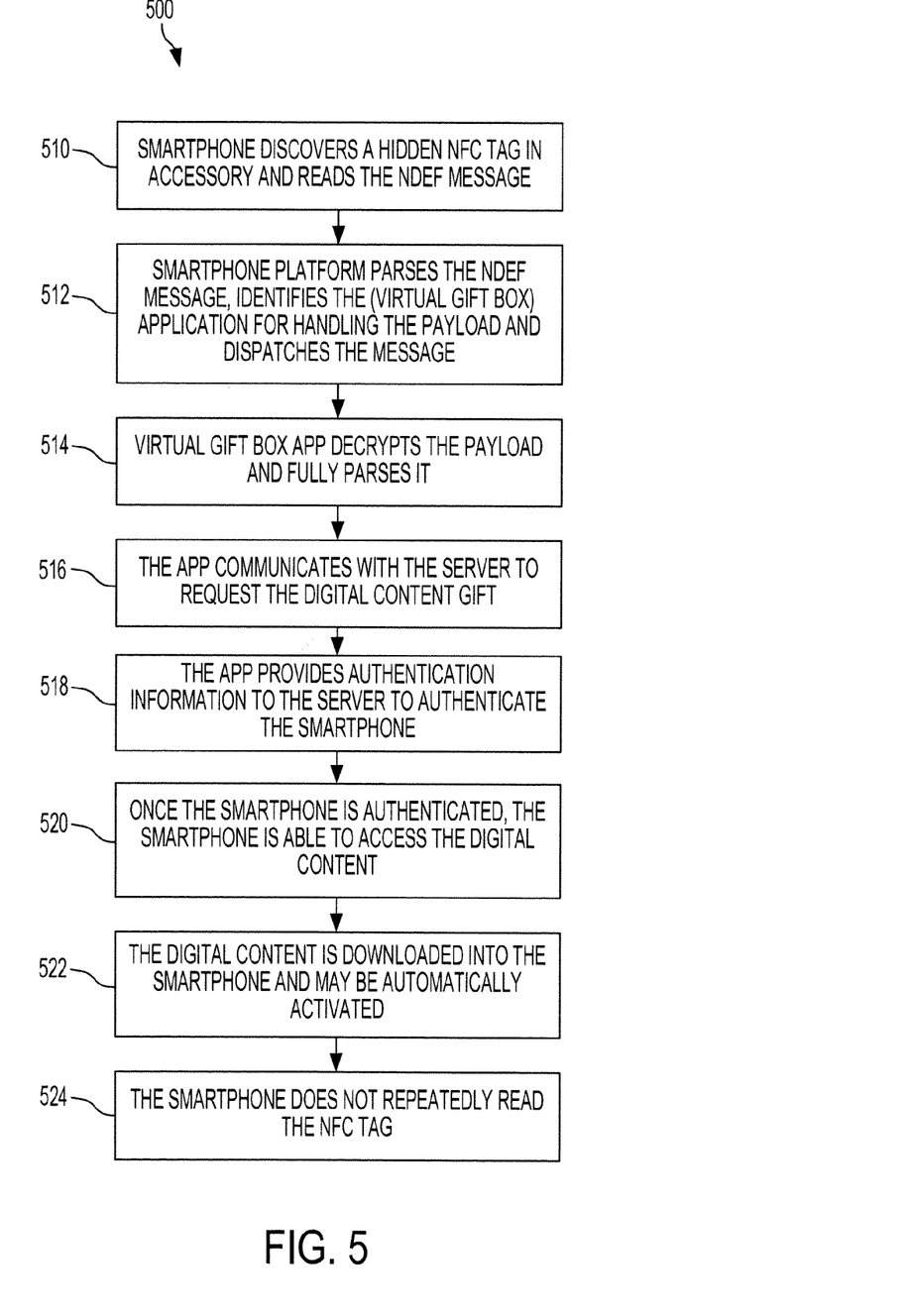
FIG. 5 illustrates an exemplary process performed by the mobile device upon discovery of the NFC tag shown in FIG. 3.

FIG. 5 illustrates an exemplary process 500 performed by the mobile device 120 upon discovery of the NFC tag 410. The process 500 begins with the mobile device 120 discovering a hidden NFC tag in the accessory 118 and reading the NDEF message (Step 510). In one implementation, the NFC controller 412 discovers the hidden NFC tag in the accessory 118 and reads the NDEF message embedded in the accessory 118. The NDEF message identifies the application 120*a* for handling the payload of the message. The NFC controller 412 dispatches the payload of the NDEF message to the application 120*a* (Step 512).

Since the accessory 118 may not be protected and may be generally accessible by others, the payload may be encrypted to prevent eavesdropping so that unnecessary information is not leaked to a person who is not intended to receive the NDEF message. The application 120*a* decrypts the payload and parses it (Step 514). The payload may identify the server 114 that holds the digital content gift data associated with the virtual gift box. The payload may also include the claim receipt for claiming the digital content gift. The application 120*a* communicates with the server 114 to request the digital content gift (Step 516). The application 120*a* provides authentication information to the server 114 to authenticate the mobile device 120 (Step 518). Once the mobile device 120 is authenticated, the server 114 may grant the mobile device 120 access to the digital content (Step 520). The digital content is downloaded to the mobile device 120 and may be automatically activated (Step 522). After processing the NFC tag, the mobile device 120 may be programmed to not repeatedly read the NFC tag and consume the mobile device's 120 power (Step 524). The NFC tag may have a hardware ID unique to that tag. The hardware ID can be read by the application 120a. The application 120a is configured to remember that tag with the unique ID has been read and processed, and ignores the tag when reading more tags.

To this end, a mobile device or personal computer may be used to access digital content (e.g., e-greeting card, ringtone, wallpaper, game) from the cloud and incorporate the digital content as a part of a virtual gift box into an accessory for delivery to the mobile device. The accessory once coupled to the mobile device opens the virtual gift box and claims the digital content from the cloud. In this example, the digital content is an anniversary e-card.

In one general aspect, a method is described for personalizing an accessory with digital content. The method includes steps of receiving, from a web portal and a distribution server, information about an order request for an accessory and digital content and storing the digital content at the distribution server along with authentication information used to authenticate a retrieval request for the digital content from a mobile device, the authentication information including a claim receipt for the digital content and a Mobile Directory Number (MDN) associated with the mobile device. The method further includes steps of receiving the retrieval request from the mobile device; responsive to the retrieval request, determining whether the mobile device is authorized to receive the digital content; and upon determining the mobile device is authorized to receive the digital content, forwarding the digital content over a communication network to the mobile device.

The above general aspect may include one or more of the following features. The accessory may include a phone cover, and the digital content may include an e-card, a ringtone, a video, an audio, or a game. A user who is intended recipient of the accessory and the digital content may be different from a user submitting the order request to the web portal. Receiving information about the order request for the accessory and digital content may include receiving at the distribution server the digital content, the MDN associated with the mobile device, a mailing address associated with the mobile device, and information about a type of accessory.

The method may further include a step of generating a virtual gift box and forwarding the virtual gift box to an accessory manufacturer to be programmed into an accessory. The virtual gift box may include the MDN as a destination address, an address of the distribution server storing the digital content as a source address, the claim receipt for identifying a location of the digital content in the distribution server storing the digital content, and an application ID identifying an application configured to process the virtual gift box on the mobile device.

The method may further include a step of encrypting the virtual gift box before forwarding the virtual gift box to the accessory manufacturer. The method may further include a step of instructing the accessory manufacturer to format the encrypted virtual gift box into an NFC Data Exchange Format (NDEF) message for programming on a memory element. The method may further include steps of determining whether the digital content is Digital Right Management (DRM) protected; and upon determining that the digital content is DRM protected, storing the digital content into a protected format. Determining whether the mobile device is authorized to receive the digital content may include comparing an MDN received as a part of the retrieval request for the digital content with the MDN stored at the distribution server to confirm that they match. Alternatively or additionally, determining whether the mobile device is authorized to receive the digital content may include determining whether the mobile device has a proper license for retrieving a DRM protected digital content.

The authentication information may include information about a specific time at which the digital content is to be provided to the mobile device, and determining whether the mobile device is authorized to receive the digital content may include determining whether the specific time has been reached. The authentication information may include information about a specific location at which the digital content is to be provided to the mobile device, and determining whether the mobile device is authorized to receive the digital content may include determining whether the mobile device is at the specific location.

These general and specific aspects may be implemented using a system, a method, a computer program, a computer readable medium, or an apparatus or any combination of systems, methods, computer programs, computer readable mediums, and/or apparatuses.

As shown by the above discussion, functions for supporting digital content delivery through augmented accessory may be implemented on computers connected for data communication via the components of a packet data network, operating as the servers 110, 112, 113, and 116 and/or as the computer 128 and the mobile device 120 as shown in FIG. 1. Although special purpose devices may be used, such devices also may be implemented using one or more hardware platforms intended to represent a general class of data processing device commonly used to run "server" programming so as to implement the functions for supporting digital content delivery through augmented accessory discussed above, albeit with an appropriate network connection for data communication.

As known in the data processing and communications arts, a general-purpose computer typically comprises a central processor or other processing device, an internal communication bus, various types of memory or storage media (RAM, ROM, EEPROM, cache memory, disk drives etc.) for code and data storage, and one or more network interface cards or ports for communication purposes. The software functionalities involve programming, including executable code as well as associated stored data, e.g. files used for the functions for supporting digital content delivery through augmented accessory. The software code is executable by the general-purpose computer that functions as the servers 110, 112, and 114 and/or that functions as a terminal device 120. In operation, the code is stored within the general-purpose computer platform. At other times, however, the software may be stored at other locations and/or transported for loading into the appropriate general-purpose computer system. Execution of such code by a processor of the computer platform enables the platform to implement the methodology for supporting digital content delivery through augmented accessory, in essentially the manner performed in the implementations discussed and illustrated herein.

Figures 6, 7:
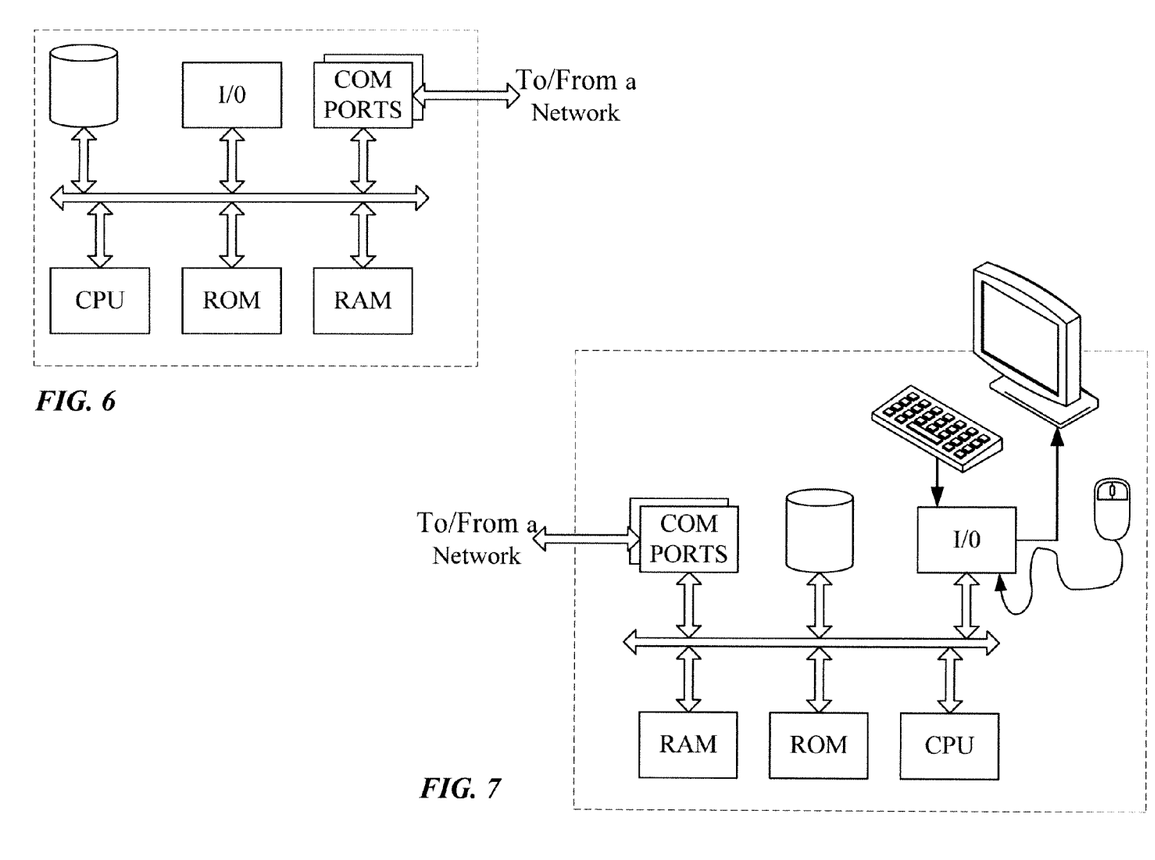
FIG. 6 illustrates a network or host computer platform, as may typically be used to implement a server.
FIG. 7 is a simplified functional block diagram of a personal computer or other work station or terminal device.

FIGS. 6 and 7 provide functional block diagram illustrations of general purpose computer hardware platforms. FIG. 6 illustrates a network or host computer platform, as may typically be used to implement a server. FIG. 7 depicts a computer with user interface elements, as may be used to implement a personal computer or other type of work station or terminal device, although the computer of FIG. 7 may also act as a server if appropriately programmed. It is believed that those skilled in the art are familiar with the structure, programming and general operation of such computer equipment and as a result the drawings should be self-explanatory.

A server, for example, includes a data communication interface for packet data communication. The server also includes a central processing unit (CPU), in the form of one or more processors, for executing program instructions. The server platform typically includes an internal communication bus, program storage and data storage for various data files to be processed and/or communicated by the server, although the server often receives programming and data via network communications. The hardware elements, operating systems and programming languages of such servers are conventional in nature, and it is presumed that those skilled in the art are adequately familiar therewith. Of course, the server functions may be implemented in a distributed fashion on a number of similar platforms, to distribute the processing load.

Hence, aspects of the methods for supporting digital content delivery through augmented accessory outlined above may be embodied in programming. Program aspects of the technology may be thought of as "products" or "articles of manufacture" typically in the form of executable code and/or associated data that is carried on or embodied in a type of machine readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer of the mobile communication network provider into the computer platform of the merchant that will be the merchant server 110. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to non-transitory, tangible "storage" media, terms such as computer or machine "readable medium" refer to any medium that participates in providing instructions to a processor for execution.

Hence, a machine readable medium may take many forms, including but not limited to, a tangible storage medium, a carrier wave medium or physical transmission medium. Non-volatile storage media include, for example, optical or magnetic disks, such as any of the storage devices in any computer(s) or the like, such as may be used to implement the functions relating to supporting digital content delivery through augmented accessory etc. shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media can take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer can read programming code and/or data. Many of these forms of computer readable media may be involved in carrying one or more sequences of one or more instructions to a processor for execution.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

What is claimed is:

1. A method, comprising:
   receiving, from a web portal and a distribution server, information about an order request for an accessory and digital content;
   storing the digital content at the distribution server along with authentication information for the digital content;
   receiving a retrieval request for the digital content from a mobile device, the retrieval request including a claim receipt for the digital content and a Mobile Directory Number (MDN) associated with the mobile device, wherein the claim receipt was obtained by the mobile device from the accessory;
   responsive to the retrieval request, determining whether the mobile device is authorized to receive the digital content using the MDN associated with the mobile device, the claim receipt, or both; and
   upon determining the mobile device is authorized to receive the digital content, forwarding the digital content over a communication network to the mobile device.

2. The method of claim 1, wherein:
   the accessory includes a phone cover, and
   the digital content includes an e-card, a ringtone, a video, an audio, or a game.

3. The method of claim 1, wherein a user who is intended recipient of the accessory and the digital content is different from a user submitting the order request to the web portal.

4. The method of claim 1, wherein receiving information about the order request for the accessory and digital content includes receiving at the distribution server the digital content, the MDN associated with the mobile device, a mailing address associated with the mobile device, and information about a type of accessory.

5. The method of claim 1, further comprising generating a virtual gift box, the virtual gift box including the MDN as a destination address, an address of the distribution server storing the digital content as a source address, the claim receipt for identifying a location of the digital content in the distribution server storing the digital content, and an application ID identifying an application configured to process the virtual gift box on the mobile device.

6. The method of claim 1, further comprising:
   determining whether the digital content is Digital Right Management (DRM) protected; and
   upon determining that the digital content is DRM protected, storing the digital content into a protected format.

7. The method of claim 1, wherein determining whether the mobile device is authorized to receive the digital content includes comparing an MDN received as a part of the retrieval request for the digital content with the MDN stored at the distribution server to confirm that the respective MDNs match.

8. The method of claim 1, wherein determining whether the mobile device is authorized to receive the digital content includes determining whether the mobile device has a proper license for retrieving a DRM protected digital content.

9. The method of claim 1, wherein:
the authentication information includes information about a specific time at which the digital content is to be provided to the mobile device, and
determining whether the mobile device is authorized to receive the digital content includes determining whether the specific time has been reached.

10. The method of claim 1, wherein:
the authentication information includes information about a specific location at which the digital content is to be provided to the mobile device, and
determining whether the mobile device is authorized to receive the digital content includes determining whether the mobile device is at the specific location.

11. A distribution server comprising:
a processor; and
a memory storing executable programming instructions, wherein when the programming instructions are executed, the processor is configured to perform functions, including functions to:
receive, from a web portal, information about an order request for an accessory and digital content;
store the digital content at the distribution server along with authentication information for the digital content;
receive a retrieval request for the digital content from the mobile device, the retrieval request including a claim receipt for the digital content and a Mobile Directory Number (MDN) associated with the mobile device, wherein the claim receipt was obtained by the mobile device from the accessory;
responsive to the retrieval request, determine whether the mobile device is authorized to receive the digital content using the MDN associated with the mobile device, the claim receipt, or both; and
upon determining the mobile device is authorized to receive the digital content, forward the digital content over a communication network to the mobile device.

12. The distribution server of claim 11, wherein:
the accessory includes a phone cover, and
the digital content includes an e-card, a ringtone, a video, an audio, or a game.

13. The distribution server of claim 11, wherein a user who is an intended recipient of the accessory and the digital content is different from a user submitting the order request to the web portal.

14. The distribution server of claim 11, wherein to receive information about the order request for the accessory and digital content the memory stores executable instructions, when the programming instructions are executed, the processor is configured to perform functions, including functions to:
receive the digital content, the MDN associated with the mobile device, a mailing address associated with the mobile device, and information about a type of accessory.

15. The distribution server of claim 11, wherein the memory further stores executable instructions, when the programming instructions are executed, the processor is configured to perform functions, including functions to:
generate a virtual gift box and forward the virtual gift box to an accessory manufacturer to be programmed into an accessory, the virtual gift box including the MDN as a destination address, an address of the distribution server storing the digital content as a source address, the claim receipt for identifying a location of the digital content in the distribution server storing the digital content, and an application ID identifying an application configured to process the virtual gift box on the mobile device.

16. The distribution server of claim 15, wherein when the programming instructions are executed, the processor is further configured to:
encrypt the virtual gift box before forwarding the virtual gift box to the accessory manufacturer.

17. The distribution server of claim 16, wherein when the programming instructions are executed, the processor is further configured to:
instruct the accessory manufacturer to format the encrypted virtual gift box into an NFC Data Exchange Format (NDEF) message for programming on a memory element.

18. The distribution server of claim 11, wherein the memory further stores executable instructions, when the programming instructions are executed, the processor is configured to:
determine whether the digital content is Digital Right Management (DRM) protected; and
upon determining that the digital content is DRM protected, store the digital content into a protected format.

19. The distribution server of claim 11, wherein to determine whether the mobile device is authorized to receive the digital content the memory further stores executable instructions, when the programming instructions are executed, the processor is configured to:
compare an MDN received as a part of the retrieval request for the digital content with the MDN stored at the distribution server to confirm that they match.

20. The distribution server of claim 11, wherein to determine whether the mobile device is authorized to receive the digital content the memory further stores executable instructions, when the programming instructions are executed, the processor is configured to:
determine whether the mobile device has a proper license for retrieving a DRM protected digital content.

21. The distribution server of claim 11, wherein:
the authentication information includes information about a specific time at which the digital content is to be provided to the mobile device, and
wherein when determining whether the mobile device is authorized to receive the digital content, the processor is further configured by execution of executable programming instructions stored in the memory to:
determine whether the specific time has been reached.

22. The distribution server of claim 11, wherein:
the authentication information include information about a specific location at which the digital content is to be provided to the mobile device, and
wherein when determining whether the mobile device is authorized to receive the digital content, the processor is further configured by execution of executable programming instructions stored in the memory to:
determine whether the mobile device is at the specific location.

23. A mobile device, comprising:
a radio frequency transceiver communicatively coupled to a mobile communication network;
a near-field communication controller configured to obtain messages from a near field communication tag in close proximity to the mobile device, wherein the messages are related to an application for retrieving digital content from a server;

a memory for storing program instructions;

a processor coupled to the radio frequency transceiver, the near field communication controller and the memory, wherein the processor, when executing program instructions, is configured to perform functions, including functions to:

in response to the mobile device being moved within proximity of a near field communication tag on an accessory device purchased with the digital content, receive virtual gift box digital information from the messages obtained from the near field communication controller;

based on information parsed from the virtual gift box digital information, send a request to the server for the digital content;

authenticate the mobile device to the server as a mobile device authorized to retrieve the digital content from the server; and upon authentication of the mobile device to the server, receive the digital content from the server.

24. The mobile device of claim 23, wherein the virtual gift box digital information includes one or more of:

a mobile directory number of the mobile device as a destination address for delivery of the digital content, an address of the server storing the digital content as a source address, a claim receipt identifying a location of the digital content in the server storing the digital content, and an application identifier identifying an application configured to process the virtual gift box on the mobile device.

* * * * *